(12) United States Patent
Kikuchi et al.

(10) Patent No.: US 7,222,181 B2
(45) Date of Patent: May 22, 2007

(54) MUSICAL SCORES DISTRIBUTING SYSTEM

(75) Inventors: Takeshi Kikuchi, Hamamatsu (JP); Kosei Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 523 days.

(21) Appl. No.: 09/860,108

(22) Filed: May 17, 2001

(65) Prior Publication Data

US 2001/0044848 A1 Nov. 22, 2001

(30) Foreign Application Priority Data

May 18, 2000 (JP) ............................. 2000-146919

(51) Int. Cl.
*G06F 15/16* (2006.01)
(52) U.S. Cl. ........................ 709/229; 709/201; 709/203
(58) Field of Classification Search ................ 709/201, 709/203, 229
See application file for complete search history.

(56) References Cited

U.S. PATENT DOCUMENTS

| | | | |
|---|---|---|---|
| 5,889,860 A * | 3/1999 | Eller et al. ..................... | 705/51 |
| 5,938,730 A | 8/1999 | Tobita | |
| 6,070,171 A * | 5/2000 | Snyder et al. .............. | 707/203 |
| 6,263,318 B1 | 7/2001 | Kimura et al. | |
| 6,427,140 B1 * | 7/2002 | Ginter et al. .................. | 705/80 |
| 6,550,011 B1 * | 4/2003 | Sims, III .................... | 713/193 |
| 6,697,944 B1 * | 2/2004 | Jones et al. ................. | 713/168 |
| 6,772,340 B1 * | 8/2004 | Peinado et al. ............. | 713/168 |

FOREIGN PATENT DOCUMENTS

| | | |
|---|---|---|
| EP | 0613073 | 8/1994 |
| JP | 2000-048076 | 2/0000 |
| JP | 06-152591 | 5/1994 |
| JP | 07-239828 | 9/1995 |
| JP | 08-263437 | 10/1996 |
| JP | 8-335170 | 12/1996 |
| JP | 9-138827 | 5/1997 |
| JP | 09-190346 | 7/1997 |
| JP | 9-258729 | 10/1997 |

(Continued)

OTHER PUBLICATIONS

Kieffer, Robert. "Image Thumbnailing Whitepaper." Jul. 1998. Alodar Systems, Inc. Whitepaper.*

*Primary Examiner*—Rupal Dharia
*Assistant Examiner*—Nicholas Taylor
(74) *Attorney, Agent, or Firm*—Morrison & Foerster LLP

(57) ABSTRACT

The utilization of various distributed contents is restricted by a simple method, its restriction can be released, and an accurate collection of fees for the contents is made possible. A client terminal 30 sends a request of contents (musical scores) and a key file to a server 10 via a communication line 20. In response to the request of these, a WEB server 11 transmits the contents stored in a database 13, and a key issuing server 12 transmits the key file. The WEB server 11 charges a fee when the key file is requested. A viewer 32 can only display the musical scores in the absence of the key file. With the use of the key file, however, the viewer 32 can print the musical scores as well. The key file is formed in accordance with a random value that is synchronized with the timing of an instruction for purchasing the contents.

32 Claims, 4 Drawing Sheets

FOREIGN PATENT DOCUMENTS

| | | |
|---|---|---|
| JP | 10-269290 | 10/1998 |
| JP | 11-085848 | 3/1999 |
| JP | 11-213010 | 8/1999 |
| JP | 11-224288 | 8/1999 |
| JP | 2000-076789 | 3/2000 |
| JP | 2000-113050 | 4/2000 |

* cited by examiner

MUSICAL SCORES DISTRIBUTING SYSTEM

BACKGROUND OF THE INVENTION

1. Field of the Invention

The present invention relates to a contents-distributing system for distributing musical scores, sentences, various figures, music data, programs, and others from a server to a client terminal to make the contents utilizable by the client terminal. Further, the present invention also relates to a contents-distributing method which is related to the contents-distributing system, a server and a client terminal utilized in the contents-distributing system, and a computer-readable recording medium containing a program applied thereto.

2. Description of the Prior Art

From the past, it is well-known in the art to obtain various contents such as musical scores, sentences, various figures, music data, programs, and others from a server via a communication line such as the internet or an exclusive-use line using a personal computer. In this case, there are cases in which various contents can be obtained free of charge, and cases in which they are obtained at a charge.

However, even in the above-mentioned conventional case of allowing various contents to be available at a charge, after a user has once downloaded the contents into a personal computer or the like, the user can utilize the downloaded contents freely, whereby the user can copy the contents without limitation simply by paying the charge once. For this reason, the server side hesitates to distribute all the contents to users, thereby imposing an obstacle against free distribution of various contents.

SUMMARY OF THE INVENTION

The present invention has been made in order to solve the aforementioned problems of the prior art, and an object thereof is to provide a contents-distributing system in which the utilization of various distributed contents is restricted by a simple method, its restriction can be released, and an accurate collection of fees for the contents is made possible. Another object of the present invention is to provide a contents-distributing method which is related to the contents-distributing system, a server and a client terminal utilized in the contents-distributing system, and a computer-readable recording medium containing a program applied thereto.

In order to achieve the aforementioned objects, the characteristic feature of the present invention lies in that, in a contents-distributing system in which one or more contents are distributed from a server that stores a plurality of contents in a database to a client terminal or which includes a client terminal that stores a plurality of contents in advance, a key file for releasing the restriction on utilization of one or more contents is supplied from the server to the client terminal in response to a request sent from the client terminal to the server, whereby the restriction on the utilization of the aforesaid one or more contents is released in the client terminal on the basis of the supplied key file.

In this case, the restriction on the utilization is, for example, to introduce the contents to a user of the contents by utilization of only a part of the contents, and more specifically described, it is to prohibit the musical scores, i.e. the contents, from being printed (display or the like is permitted). By the key file supplied from the server to the client terminal, the restriction on the utilization of the contents is released in the client terminal. As a result of this, by the presence of the key file, free utilization of the contents is restricted even if the user of the contents has obtained only the contents, so that the server side can freely supply the contents to the client terminal in a form such as communication or a recording medium. Further, since the key file is provided independent from the contents, the restriction on the utilization such as copying of the contents can be easily added to a person that has obtained the key file, as described below.

For example, as the release of restriction on the utilization of the contents by a key file, release of the restriction on the utilization of the contents under constraint of the number of times for the utilization or under constraint of time, or erasure of the key file utilized for the release of the restriction on the utilization of the contents after the release of the restriction on the utilization, is adopted. By this, unlimited utilization of the contents can be easily inhibited.

Further, if a fee is charged on the user in the client terminal at the time of request for the key file, the fee can be easily charged on the user.

Further, another characteristic feature of the present invention lies in that it is possible to allow reissuance of the key file for a predetermined number of times or within a predetermined period of time after the key file is initially transmitted, in accordance with the request of the key file from the client terminal. By this, the user that has lost the key file by error can be allowed to utilize the contents.

Further, in preparation, supplying, and utilization of the key file, an identification data specific to a timing of the request of the key file is generated and stored when the client terminal sends the request of the key file to the server, and the identification data is supplied to the server together with the request of the key file. The server supplies the key file containing the identification data to the client terminal, and the client terminal releases the restriction on the utilization of the contents by comparison between the identification data stored in the client terminal and the identification data contained in the transmitted key file. In this case, the identification data may be set, for example, at a value which changes at random in accordance with passage of time and which is synchronized with the timing of the request of the key file.

By this, the identification data is not set at a substantially identical value, and can be easily formed, so that the safety in the release of the restriction on the utilization of the contents can be easily ensured. In addition, if this key file is encoded, the safety in the release of the restriction on the utilization of the contents can be maintained at a further high level.

Further, another characteristic feature of the present invention lies in a contents-distributing method, a server and a client terminal utilized in the contents-distributing system, and a computer-readable recording medium containing a program applied thereto, for realizing the distribution of contents as described above. By these, the afore said contents-distributing system can be appropriately constructed.

DETAILED DESCRIPTION OF THE INVENTION

Figure 1:
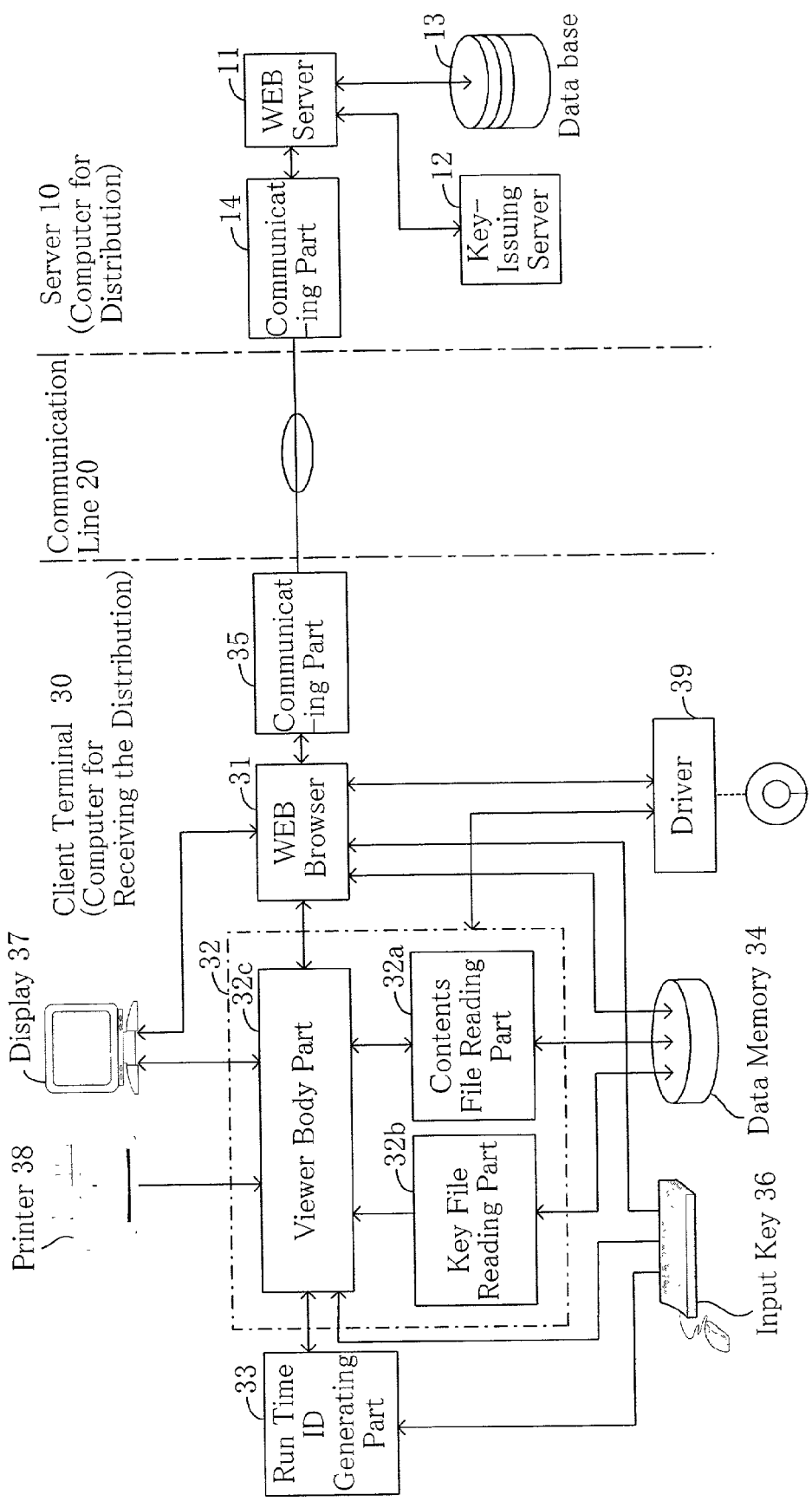
FIG. 1 is a block diagram illustrating a contents-distributing system as a whole according to one embodiment of the present invention.

Hereafter, one embodiment of the present invention will be described. In this embodiment, the contents-distributing system according to the present invention is applied to a musical score distributing system for distributing musical scores to a user for utilization. Referring to FIG. 1, this musical score distributing system includes a computer 10 for distribution (referred to as a server in this specification), a communication line (network) 20 such as the internet, a public telephone line, an exclusive-use line, or a LAN, and a plurality of computers for receiving the distribution (referred to as client terminals in this specification) as terminal devices. Here, in FIG. 1, only one client terminal 30 is shown.

The server 10 includes a WEB server 11, a key-issuing server 12, a database 13, and a communicating part 14.

Actually, in this case, the WEB server 11 and the key-issuing server 12 are programs that are stored in a program memory in the server 10. In response to a signal from the client terminal 30, the WEB server 11 supplies various data including the contents file stored in the database 13 and the key file issued by the key-issuing server 12 as well as programs and others to the client terminal 30 via the communicating part 14 and the communication line 20 according to a given communication protocol (for example, an HTTP (Hyper Text Transfer Protocol)). The WEB server 11 also receives various data and programs from the client terminal 30 via the communication line 20 and the communicating part 14. The contents file contains contents data and a contents identification data CID corresponding to the contents data.

The key-issuing server 12 prepares an encoded key file on the basis of the contents identification data CID that designates each of the contents in correspondence with each of the contents and a runtime identification data RID supplied from the client terminal 30. Here, the runtime identification data RID is a specific data issued according to the timing of an instruction for purchase when the client terminal 30 purchases the contents file, and the RID is utilized for confirmation of the purchase.

The database 13 is a large-capacity memory device such as a hard disk or an CD that stores a large number of encoded contents files representing a large number of musical scores. Here, the contents in this case refer to musical scores, and the contents file is made of the contents data, the contents identification data CID, and others. The contents data are musical score data made of a large number of data representing a series of musical notes, musical symbols, and others for printing the musical scores. The contents identification data CID is a specific data representing the contents data (musical score data) for identifying the contents data. Further, the musical score data may be constructed with image data obtained by capturing the musical score simply as a figure. The communicating part 14 transmits and receives various data and programs to and from the communication line 20 according to a given communication protocol (for example, an HTTP).

The client terminal 30 includes a WEB browser 31, a viewer 32, a runtime ID generating part 33, a data memory 34, and a communicating part 35.

Actually, in this case, the WEB browser 31, the viewer 32, and the runtime ID generating part 33 are programs stored in a program memory in the client terminal 30. The WEB browser 31 reads various data such as a contents file and a key file as well as programs for storage thereof in the data memory 34 in accordance with a supplied instruction, gives an instruction to the viewer 32, and supplies various data and programs to the server 10 via the communicating part 35.

The viewer 32 functions as a helper application of the WEB browser 31, and reads the contents file, the key file, and others stored in the data memory 34 to let the contents file utilizable by the user in accordance with an instruction of the user. This viewer 32 includes a contents file reading part 32a and a key file reading part 32b. The contents file reading part 32a deciphers the contents files stored in the data memory 34 to decode the contents data and the contents identification data CID corresponding to the contents data. The key file reading part 32b deciphers the key file stored in the data memory 34 to restore the contents identification data CID and the runtime identification data RID. The viewer body part 32c cooperates with the WEB browser 31 to send and receive data to and from the server 10 and cooperates with the contents file reading part 32a and the key file reading part 32b to let the contents file utilizable by the user.

The runtime ID generating part 33, in response to an instruction of the user, generates a runtime identification data RID specific to the timing of the instruction. For example, the runtime ID generating part 33 incorporates a random number generator that generates a random number of plural bits in accordance with passage of time, and generates the random number as a run time identification data RID in synchronization with the instruction timing of the user.

The data memory 34 is a memory device having a comparatively large capacity such as a hard disk or an CD that stores the contents files, the key files, and others. The communicating part 35 corresponds to the communicating part 14 of the server 10, and transmits and receives various data and programs to and from the communication line 20 in accordance with a give communication protocol (for example, an HTTP).

The client terminal 30 also includes an input key 36, a display 37, a printer 38, and a driver 39. The input key 36 includes keys corresponding to characters or numerals, a mouse and others to supply an instruction signal, an input data, and others corresponding to a key operation of the user to the WEB browser 31, the viewer body part 32c, and the runtime ID generating part 33. The display 37 visually displays characters and figures, and displays various ones including a musical score in accordance with an instruction from the WEB browser 31, the viewer body part 32c, or the like. The printer 38 prints the characters and figures, and prints various ones including a musical score in accordance with an instruction from the WEB browser 31, the viewer body part 32c, or the like. The driver 39 is controlled by the WEB browser 31, the viewer body part 32c, and other programs (not illustrated) to read data and programs from an external recording medium such as a CD (Compact Disk), an MD (Mini Disk (trademark)), or a flexible disk, and to write data and programs to the recording medium.

Next, an operation of the contents-distributing system constructed as above will be described; however, before that, a construction of the distributing system will be described. On the server 10 side, a program memory of a computer having a comparatively large size is allowed to store a general program for realizing the WEB server 11 and an exclusive-use program for realizing the key-issuing server 12. In allowing these programs to be stored in the program memory, the programs prepared in advance and stored in a CD, an MD, or the like may be allowed to be stored in the program memory of the server 10 with the use of a driver (not illustrated). Further, a lot of contents files each made of the contents data representing the musical score and the contents identification data CID corresponding to the contents data are prepared, and the prepared contents files are stored in the database 13. For facility in searching for each musical score (music), the contents files are allowed to contain the genre of the music, the difficulty of playing the music, the price in selling the music, and others in addition to the name of the music and the composer of the music. Further, addition and renewal can be made at all times on the contents files in the database 13.

On the other hand, on the client terminal 30 side, a program memory of a general personal computer is allowed to store a general program for realizing the WEB browser 31 and an exclusive-use program for realizing the viewer 32 and the runtime ID generating part 33. In this case, these programs may be downloaded from the server 10 or another computer by a program (not illustrated). Further, a CD, an MD, or the like that stores the aforesaid programs may be distributed to the user in accordance with a request of the user, for installation by the user via the driver 39 with the use of a program (not illustrated).

Figure 2:
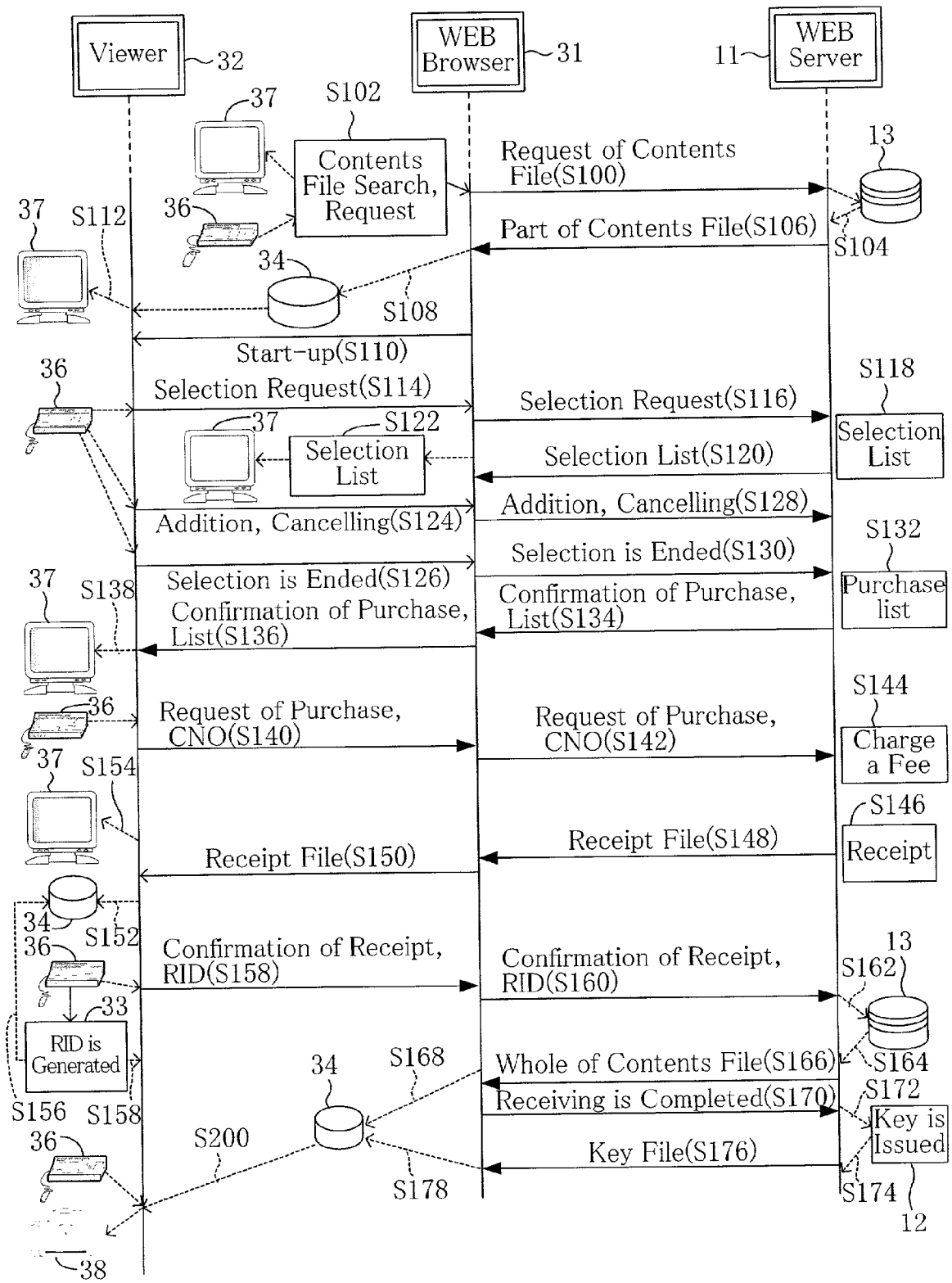
FIG. 2 is a functional diagram illustrating a work flow according to the distributing system of FIG. 1.

Next, an operation of the contents-distributing system constructed as above will be described along the procedure shown in FIG. 2. First, the user starts the WEB browser 31 of the client terminal 30 and sends a request of a contents file to the WEB server 11 with the use of the input key 36 (S100). In this case, by accessing the server 10, the user lets the display 37 display the menu data and others supplied from the server 10 and requests for a musical score of a desired music by searching for the musical score with the use of the input key 36 (S102).

In response to these, the WEB server 11 of the server 10 reads the requested contents file out from the database 13 (S104), and transmits a part of the contents file to the WEB browser 31 of the client terminal 30 (S106). However, the part of the contents file contains the contents identification data CID corresponding to the contents themselves. The WEB browser 31 stores the transmitted part of the contents file in the data memory 34 (S108), and starts the viewer 32 (S110). In the viewer 32, the contents file reading part 32*a* reads and deciphers the part of the contents file stored in the data memory 34 to decode the part of the file. With the use of the part of the contents file that has been decoded, the viewer body part 32*c* displays the musical score corresponding to the part of the file by means of the display 37 (S112). In this case, the musical score displayed on the display 37 is only a part of the musical score corresponding to the part of the contents file. Moreover, it is not possible to print the musical score, and the displayed musical score is smaller in size or has a rougher display resolution than usual in order to prevent the musical score from being hard-copied.

Here, in this embodiment, only a part of the requested contents file is supplied from the server 10 to the client terminal 30 in this state; however, the whole of the requested contents file may be supplied from the server 10 to the client terminal 30. Nevertheless, in this case also, the printing based on the supplied contents file is prohibited, and a part of the musical score corresponding to the part of the file is displayed in a small size. However, since the displayed musical score is smaller in size or has a rougher display resolution in order to prevent the musical score from being hard-copied as described above, the whole musical score may be allowed to be displayed. Here, if the whole of the contents file is supplied as described above, the transmittance of the whole contents file in the later-mentioned procedure S166 will be unnecessary.

When the user gives an instruction of selection for purchasing the displayed musical score with the use of the input key 36, the selection request is sent from the viewer 32 to the WEB browser 31 (S114), and the WEB browser 31 transmits the selection request to the server 10 (S116). In this case, the viewer 32 may generate a series of music sounds corresponding to the contents file on the basis of the contents data (musical score data) or other data contained in the contents file with the use of a sound source circuit (not illustrated) incorporated in the client terminal 30, so as to facilitate the selection of the musical score by the user.

On the other hand, in the server 10, when the WEB server 11 receives the selection request, a list of the musical scores (music) selected by the user is prepared (S118), and the prepared list is transmitted to the client terminal 30 (S120). In the client terminal 30, the WEB browser 31 receives the selection list, and displays the contents of the selection list on the display 37 (S122). The selection list contains the contents identification data CID showing the contents themselves; however, what are displayed are the name of the music, the composer of the music, and others. At the same time, the display 37 displays the waiting for an instruction on which is to be selected: addition of a new contents file, cancellation of the already selected contents file, or end of the operation of selecting the contents file.

When the user gives an instruction on which is to be selected: addition of a contents file, cancellation, or end of selection with the use of the input key 36, the viewer 32 informs the WEB browser 31 of the instruction (S124, S126). If the WEB browser 31 is informed of addition or cancellation, the WEB browser 31 informs the server 10 to that effect (S128). In the case of addition, the WEB browser 31 starts the above-described request of the contents file (S100) again. This allows the contents files requested by the user to be successively added to the selection list according to the procedures of S100 to S122. In the case of cancellation, the WEB server 11 deletes the cancelled contents file from the prepared selection list, and transmits the selection list again to the client terminal 30 (S120). Then, in the client terminal 30, the WEB browser 31 renews the selection list (S122).

On the other hand, if an instruction for the end of selection is sent from the viewer 32 to the WEB browser 31 (S126), the WEB browser 31 informs the server 10 of the end of selection (S130). In the server 10, the WEB server 11 prepares a purchase list containing a purchase fee as well as the contents of the prepared selection list (S132), and transmits the purchase list and the confirmation on the purchase to the client terminal 30 (S134).

In the client terminal 30, the WEB browser 31 informs the viewer 32 of the purchase list and the confirmation of purchase (S136), and the viewer 32 displays the purchase list and the confirmation of purchase on the display 37 (S138). In this case, the display 37 displays the name of the music selected by the user, the composer of the music, the purchase fee, and others, and also displays an inquiry on the method of payment (for example, a credit card number CNO) as the confirmation of purchase. When the user requests for purchase and inputs the method of payment with the use of the input key 36, the viewer 32 informs the WEB browser 31 of the request for purchase, the method of payment (credit card number CNO), and others (S140), and the WEB browser 31 transmits the request for purchase, the method of payment (credit card number CNO), and others to the server 10 (S142).

In the server 10, in response to the request for purchase, the WEB server 11 charges a fee on the user in accordance with the method of payment which has been transmitted (S144), and thereafter the charged fee is collected from the user. After charging the fee, the WEB server 11 prepares a receipt corresponding to the purchase list (S146), and transmits the receipt file to the client terminal 10 (S148). This receipt file contains the data on the music corresponding to the contents (musical scores) purchased by the user, such as the name of the music and the composer, fees of the music and the total sum of the fees for purchase, as well as the contents identification data CID corresponding to the contents themselves.

In the client terminal 30, the WEB browser 31 informs the viewer 32 of the receipt file (S150), and the viewer 32 stores the receipt file in the data memory 34 (S152), and the display 37 displays the name of the music of the contents (musical scores), the composer, and others of the purchased contents (musical scores), fees of the music, and the total sum of the fees for purchase in accordance with the receipt file, as well as the confirmation on the receipt of the receipt file (S154).

When the user confirms the receipt with the use of the input key 36, the run time ID generating part 33 operates in response to the confirmation operation with the input key 36 to generate a runtime identification data RID (random number of plural bits) which is synchronized with the timing of the confirmation operation. This runtime identification data RID is stored by the viewer 32 into the data memory 34 in correspondence with the purchase file (S156). At the same time, the viewer 32 informs the WEB browser 31 of the confirmation of receipt and the runtime identification data RID (S158), and the WEB browser 31 transmits the confirmation of receipt and the runtime identification data RID to the server 10 (S160).

In the server 10, the WEB server 11 stores the transmitted confirmation of receipt and the runtime identification data RID into the database 13 (S162). The WEB server 11 reads all the contents files related to the designated contents (musical scores) out from the database 13 on the basis of the receipt file (the same applies in the case of the selection list and the purchase list) (S164), and transmits the whole contents files to the client terminal 30 (S166). In the client terminal 30, the WEB browser 31 receives the whole contents files that have been transmitted, stores the contents files into the data memory 34 (S168), and transmits the completion of receiving to the server (S170).

In the server 10, in response to the completion of receiving, the WEB server 11 starts the key-issuing server 12 and informs the key-issuing server 12 of the contents identification data CID respectively corresponding to all of the transmitted contents (musical scores) and the runtime identification data RID received from the client terminal 10 (S172). The key-issuing server 12 prepares a key file containing the contents identification data CID and the runtime identification data RID, and encodes the key file to pass the key file to the WEB server 11 (S174). The WEB server 11 transmits the encoded key file to the client terminal 30 (S176). At this time, the key file is also stored into the database 13.

In the client terminal 30, the WEB browser 31 stores the transmitted key file into the data memory 34 (S178). This allows the data memory 34 of the client terminal 30 to store all the contents files purchased by the user and the key file representing the purchase, and to store the runtime identification data RID formed by the procedure S156 together with the contents identification data CID showing the contents themselves.

Next, the case of printing the contents (musical scores) will be described. In this embodiment, with the viewer 32 started, the user operates the input key 36 to allow the data memory 34 to read the contents file and the key file out, and the contents (musical scores) are printed under a condition of the presence of an appropriate key file (S200 in FIG. 2).

Figure 3:
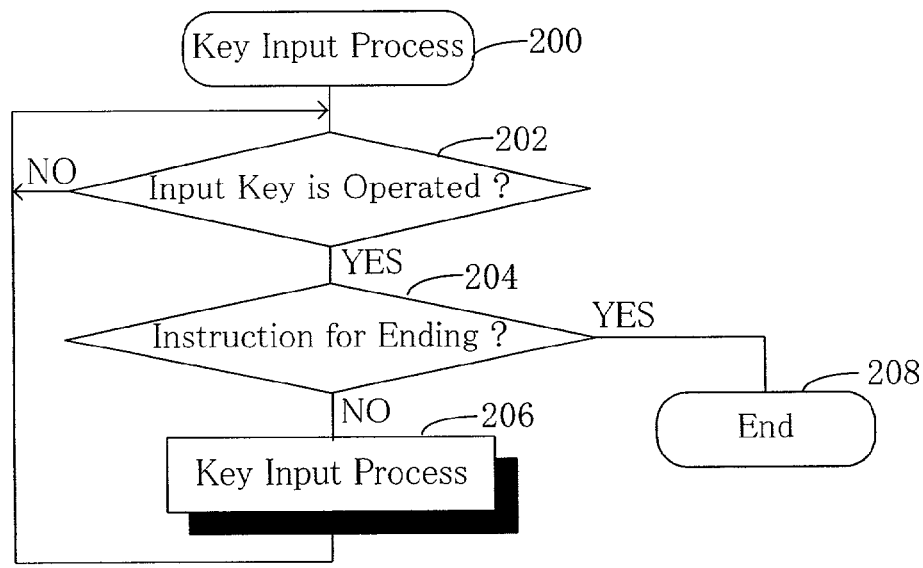
FIG. 3 is a flow chart of a key input processing program showing the utilization of contents by a client terminal.
Figure 4:
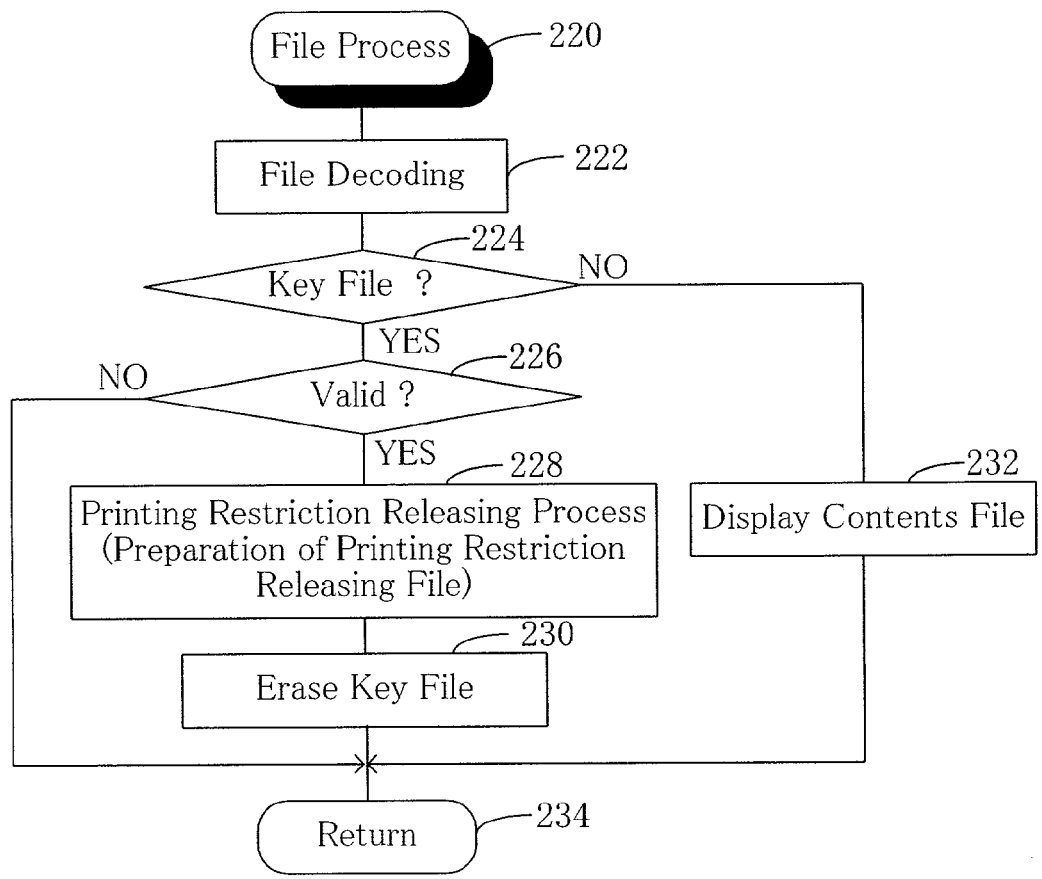
FIG. 4 is a detailed flow chart of a file processing routine of FIG. 3.
Figure 5:
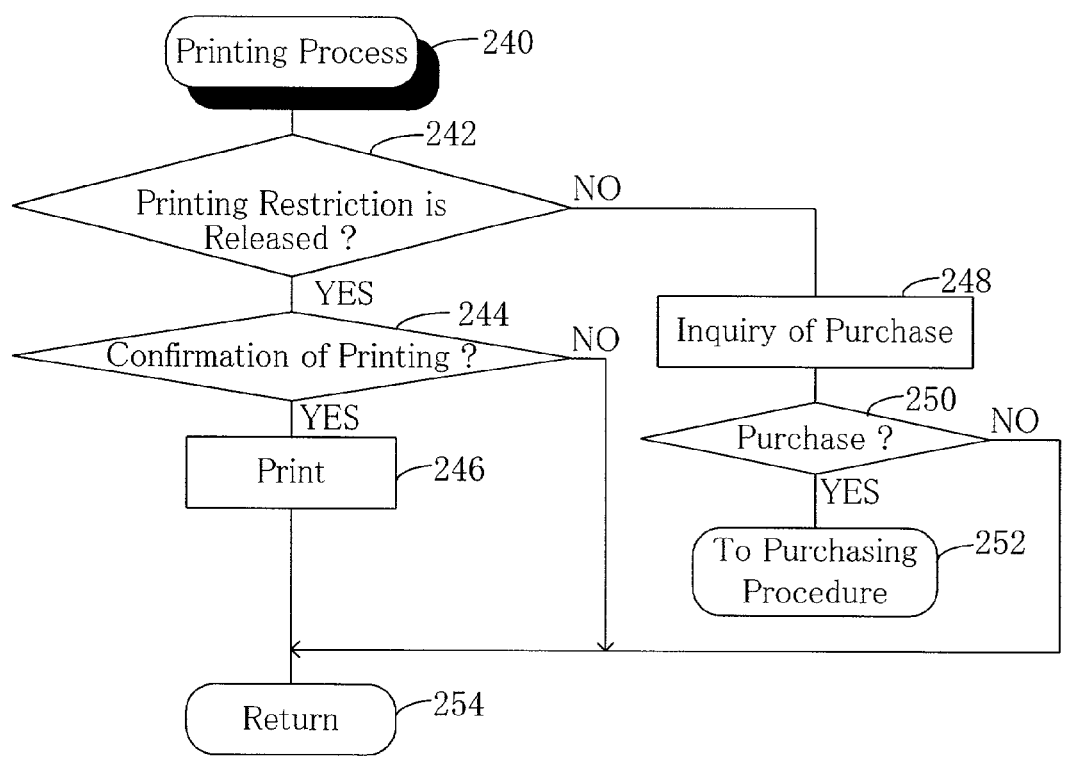
FIG. 5 is a detailed flow chart of a printing processing routine of FIG. 3.

This operation will be described with the use of the flowcharts shown in FIGS. 3 to 5. Referring to FIG. 3, the key input processing program in the viewer 32 is repeatedly executed from the time of being started in the step 200 in FIG. 3 (S110 in FIG. 2) till the instruction for the end of the processes of the steps 202 to 206 is given. In the step 202, whether the input key 36 has been operated or not is determined, and if the key 36 is not operated, the process of the step 202 continues to be executed. If the input key 36 is operated, the determination of "YES is given in the step 202, and whether the operation of the input key 36 is an instruction for the end of the processes or not is determined in the step 204. If the operation of the input key 36 is not an instruction for the end of the processes, the determination of "NO is given in the step 204, and the process corresponding to the operated input key 36 is executed in the step 206.

In this case, only the processes related to the printing of the contents (musical scores) related to the present invention will be described. If an instruction for the process of opening the designated file is given by the input key 36, the file processing routine of FIG. 4 is executed in the step 206. This file processing routine is started in the step 220 of FIG. 4, and the designated file (in this case, either the contents file or the key file) is read out from the data memory 34 and the read-out file is deciphered to decode the file in the step 222. Next, whether the decoded file is a key file or not is determined in the step 224.

If the decoded file is a key file, the determination of "YES" is given in the step 224, and whether the decoded key file is valid or not is determined in the step 226. In this determination, the contents identification data CID and the runtime identification data RID contained in the key file are respectively compared with the contents identification data CID contained in the receipt file stored in the data memory 34 by the procedure S152 and the runtime identification data RID stored in the data memory 34 by the procedure S156. If each of the contents identification data CID and the runtime identification data RID is coincident, the key file is determined to be valid.

If the key file is valid, the determination of "YES" is given in the step 226, and the restriction on printing is released. Specifically, a printing restriction releasing flag representing the release of the restriction on printing is each added to one or more contents identification data CID (contents identification data CID corresponding to one or more contents files purchased by the user) contained in the decoded key file. The contents identification data CID to which the printing restriction releasing flag has been added is temporarily stored as a printing restriction releasing file. Here, the temporary storage of the printing restriction releasing file refers to storage in a RAM or the like of the client terminal 30, and the printing restriction releasing file is erased at the time of the end of the operation of the viewer 32. Next, the key file is erased from the data memory 34 in the step 230. This makes it impossible to read the key file out again.

On the other hand, if the file decoded by the process of the step 222 is a contents file, the determination of "NO is given in the step 224, and the contents file (musical score file) is displayed on the display 37 in the step 232. In this case also, the musical score displayed on the display 37 is sufficiently small in size and has a rough display resolution in order to prevent the musical score from being hard-copied. In this case, however, the operation of the input key 36 allows all the pages of the designated contents file (musical score of the designated music) to be displayed. After the process of the step 230 or the step 232, the execution of the file processing routine is temporarily ended in the step 234.

If an instruction for printing the contents file (musical score) is given by the input key 36 in a state in which the contents file (musical score) is displayed on the display 37 as described above, the printing processing routine of FIG. 5 is executed in the step 206 of FIG. 3. This printing processing routine is started in the step 240 of FIG. 5, and whether the restriction on the printing of the contents (musical scores) being displayed on the display 37 is released or not is determined in the step 242. In this determination, whether the contents (musical score) currently being displayed can be printed or not is determined by making reference to the printing restriction releasing file. Namely, whether or not the printing restriction releasing flag has been added to the contents identification data CID coincident with the contents identification data CID corresponding to the contents (musical score) being displayed and stored in the printing restriction releasing file, is determined.

If the restriction on the printing of the contents (musical score) being displayed is released, the determination of "YES" is given in the step 242, and the confirmation of printing (for example, display of "whether the printing is to be performed or not) is carried out by the display 37 in the step 244. In this case, it is convenient if the size of printing paper, characters for printing, size of the musical score to be printed, pages to be printed, and others can be designated. If the user gives an instruction for printing with the use of the input key 36, the determination of "YES given in the step 244, and the printer 38 is controlled in the step 246, whereby the contents (musical score) being displayed are printed.

Thus, a plurality of contents (musical scores) stored in the data memory 34 can be successively printed by repeating the process of displaying the contents (musical scores) on the display 37 and printing the contents (musical scores) by the printing process as described above. Also, in the confirmation of the printing, if the user gives an instruction to the effect of not printing with the use of the input key 36, the determination of "NO" is given in the step 244, and the execution of the printing processing routine is temporarily ended in the step 254.

On the other hand, if the determination of "NO" is given in the determination on the release of the restriction on printing in the step 242, i.e. if it is determined that the restriction on the printing of the contents (musical score) being displayed is not released, the procedure is forwarded to the process of the step 248. In the step 248, the display 37 displays an inquiry to the user on whether the contents (musical score) being displayed is to be purchased or not, and an instruction of the user is awaited in the step 250. If the user wishes to purchase the contents (musical score) with the use of the input key 36, the determination of "YES is given in the step 250, and the procedure of the purchasing process, i.e. the process of forwarding the program to the stage just before the procedure S114 of FIG. 2, is executed in the step 252. Further, if the user does not wish to purchase the contents (musical score), the determination of "NO is given in the step 250, and the execution of this printing processing routine is temporarily ended in the step 254.

Further, if the user gives an instruction for the end with the use of the input key 36 in the key input processing program of FIG. 3, the determination of "YES" is given in the step 204, and the execution of this key input processing program is ended in the step 208. Here, the end of execution of the key input processing programs signifies the end of the operation of the viewer 32 as well, and the viewer 32 does not start the operation unless it is started again.

As will be understood from the above description, according to the above embodiment, the contents files representing the musical scores are supplied from the server 10 side to the client terminal 30 side by interaction between the client terminal 30 and the server 10 via the communication line 20, and the client terminal 30 can print the musical scores represented by the supplied contents files, so that the user can obtain various musical scores with ease. In this case, the key file is sent from the server 10 side to the client terminal 30 side only when the client terminal 30 expresses a wish of purchase, and the key file releases the restriction on the printing of the contents (musical scores), thereby preventing unlimited printing of the contents (musical scores). Moreover, the user can confirm the part of the contents (musical scores) that the user wishes to print on the display 37, and can view or listen to the part of the music corresponding to the musical scores, thereby providing convenience for the user.

Further, in preparing the key file, the runtime identification data RID is sent from the client terminal 30 side to the server 10 side in accordance with the timing of the wish of purchase by the user, and the server 10 prepares a key file containing the runtime identification data RID and the contents identification data CID corresponding to the contents file that the user wishes. This key file is sent to the client terminal 30, and the client terminal 30 compares the key file with the runtime identification data RID that was stored when the runtime identification data RID was sent to the server 10. In accordance with the result of the comparison, the restriction on the printing of the contents (musical score) is released. In this case, in generating the runtime identification data RID, the runtime identification data RID is generated at random in accordance with each timing of expressing the wish of purchase by the user, so that an identical value is least likely to be given as the runtime identification data RID, whereby the release of the restriction on the printing is carried out simply and accurately.

Here, in the above-described embodiment, as long as the viewer 32 is in operation, the printing restriction releasing file once prepared is preserved in the RAM, so that the user can print the contents (musical scores) whose restriction on printing is released, as many times as the user wishes. Therefore, in this case, even if the user fails to print the contents (musical scores) once, the user can print the contents (musical scores) again, thereby providing convenience for the user. However, if the operation of the viewer 32 is ended, the printing restriction releasing file is erased from the RAM, and also, since the key file is erased after the printing restriction releasing file is prepared, it is not possible to print the musical scores.

Further, as long as the operation of the viewer 32 is continued, unlimited printing of the contents (musical scores) by the user is permitted, so that the number of times for printing may be limited. In this case, in the printing process in the step 246 of FIG. 5, the number of times for printing may be counted and stored for each of the printed contents (musical scores), and the determination on the release of the restriction on printing may be carried out under such a condition that the counted number does not exceed a predetermined number of times for each of the contents (musical scores) in addition to the condition such that the above-described printing restriction releasing flag is set. This limits the number of times for printing the contents (musical scores) to be under a predetermined number each time the viewer 32 is started.

Further, in the case of limiting the number of times for printing, the printing restriction releasing file and the counted number may be stored in the data memory 34 to allow them to be preserved also when the operation of the viewer 32 is ended, instead of erasing the printing restriction releasing file when the operation of the viewer 32 is ended. This makes it possible to print the contents (musical scores) up to a predetermined number of time when the viewer 32 is started again after the operation of the viewer 32 is once ended.

Further, the number of times for permitting the printing may be encoded and stored in the key file, and the number of times for allowing the printing may be arbitrarily designated. For example, the number of times may be designated when the contents file is purchased, or the number of times may be determined in various ways in accordance with the type of the contents.

Furthermore, instead of limiting the number of times for printing the contents (musical scores), the restriction on the printing of the contents (musical scores) may be released until a predetermined period of time passes or until a predetermined time limit after the time point when the user issues the request for purchase (the time when the runtime identification data RID is transmitted from the client terminal 30 to the server 10). In this case, the predetermined time obtained by adding a predetermined period of time to the aforesaid time point or the predetermined time after the aforesaid time point may be stored in the client terminal 30, and the determination on the release of the restriction on printing may be carried out under a condition such that the current time is before the stored predetermined time point with the use of a clock circuit (timer circuit) incorporated in the client terminal 30 in addition to the condition such that the aforesaid printing restriction releasing flag is set as described before in the step 242 in FIG. 5.

In this case also, if the printing restriction releasing file and the predetermined time point are stored in the RAM and erased when the operation of the viewer 32 is ended, the repeated printing of the contents (musical scores) is limited to the period of time when the viewer 32 is in operation. Further, if the printing restriction releasing file and the predetermined time point are stored in the data memory 34 and preserved also at the time when the operation of the viewer 32 is ended, the printing of the contents (musical scores) can be carried out until the aforesaid time point in the case where the viewer 32 is started again.

Further, these limitations to the predetermined number of times, the predetermined period of time, and the predetermined time limit may be managed on the server 10 side. In this case, the printing restriction releasing file, the number of times for printing by the client terminal 30, the predetermined period of time, the predetermined time limit, and others may be stored in the database 13, and the printing of the contents (musical scores) may be permitted under the aforesaid condition in accordance with the request sent from the client terminal 30 side to the server 10 side. In this case, the server 10 may each time transmit the data that permits the printing of the contents (musical scores) to the client terminal 30 or transmit the key file to the client terminal 30.

Further, in the above embodiment, in response to the request of the client terminal 30, the server 10 transmits the requested contents files one by one via the communication line 20 and, in response to the transmittance of the runtime identification data RID from the client terminal 30, transmits the key file to the client terminal 30 via the communication line 20. However, with regard to the contents files, all of the contents files or a large number of contents files stored in the database 13 may be transmitted to the client terminal 30 via the communication line 20, and the client terminal 30 side may store the aforesaid all of or large number of contents files in the data memory 34. Further, a recording medium such as a CD or an MD that contains a large number of contents files may be distributed to the user by a method such as postal service, home delivery service, or the like. In this case, the user may start the viewer 32 to read the contents files stored in the data memory 34 or in the recording medium such as a CD or an MD to display them on the display 37, and transmit the request for selection of the desired contents files to the server 10. In other words, the user may purchase the contents files according to the procedure after S114 of FIG. 2.

Further, in the above embodiment, in response to the request of the client terminal 30, the server 10 transmits the key file to the client terminal 30 only once; however, the server 10 may reissue the key file in accordance with a request given by the client terminal 30 within a predetermined number of times or within a predetermined period of time. In this case, in the server 10, the key-issuing server 12 may count the number of times for the transmittance of the key file, or measure the period of time since the first issuance of the key file and, only in the case where the counted number is within a predetermined value or where the measured period of time is within a predetermined period of time, the server 10 may reissue the key file in response to the request given by the client terminal 30. This makes it possible for the client terminal 30 to release the restriction on the utilization of the contents files one purchased even in the case where the client terminal 30 has lost the key file before using the key file by a disorder or an operation error of the client terminal 30, thereby providing convenience for the user.

Further, in the above embodiment, after the user selects plural contents files one by one, the user purchases the plural contents files simultaneously. However, instead of this, each time the user selects the contents file, the user may be allowed to purchase the contents file. In this case, for each contents file, one key file is supplied from the server 10 to the client terminal 30.

Further, in the above embodiment, after the user gives an instruction for the purchase of the contents files with the use of the input key 36, the server 10 executes the process of charging a fee and the process of transmitting the receipt file, and thereafter, the confirmation on the receiving of the receipt file is carried out, and, at that time, the runtime identification data RID generated in the runtime ID generating part 33 is transmitted to the server 10 (S140 to S160). However, for simplifying this, the runtime identification data RID corresponding to the timing of the request for purchase may be transmitted to the server 10 simultaneously with giving the instruction to purchase the contents files without waiting for the receipt file to be received. In this case, the receipt file, all the contents files, the key files, and others are transmitted simultaneously from the server 10 to the client terminal 30 after the user gives an instruction of purchase.

Further, in the above embodiment, the client terminal 30 performs all the communications to the server 10 for purchasing the contents files with the use of a personal computer. However, a part of the communications with the server 10 may be carried out by different communication means, for example, by telephone, portable telephone, postal service, home delivery service, or the like. For example, when the user gives a request of purchase to the viewer 32 on the client terminal 30 side (S140 in FIG. 2), the runtime identification data RID generated in the runtime ID generating part 33 is allowed to be displayed on the display 37. The data corresponding to the separately displayed contents (which may be a contents identification data CID) and the displayed data RID are sent to the server 10 side by the different communication means described above. The server 10 side takes both of these sent data into the key-issuing server 11 by a manual operation or the like, forms a key file in the same manner as in the above embodiment, and sends the formed key file to the user by the different communication means. The user takes the key file into the viewer 32 of the client terminal 30 with the use of the input key 36 or the like. This makes it possible for the client terminal 30 to print the contents (musical scores). This method is especially effective if all of or a large number of the contents files stored in the database 13 are already transmitted to the client terminal 30 side in advance by the communication line 20, or by a CD or an MD.

Further, in the above embodiment, the communication between the server 10 and the client terminal 30 is carried out via the communication line (network) 20 such as the internet, a public telephone line, an exclusive-use line, or a LAN; however, the communication line 20 is not limited to a wired line, so that one may utilize a wireless line such as a satellite communication line, a portable wireless telephone line, or a BlueTooth.

Further, in the above embodiment, an example has been described in which a personal computer (a general-purpose computer) is used as the client terminal 30 which is a terminal device. However, as the terminal device, various apparatus that can communicate information with other apparatus, such as a portable personal information terminal (PDA), a portable telephone, a game apparatus for home use (including a portable game apparatus), a copying machine, a facsimile device, or an electronic musical instrument can be utilized instead of the general-purpose computer as long as the apparatus includes a microprocessor functioning part such as a CPU, an interface part or the like for receiving data such as a contents data and a key file via the aforesaid broad-sense communication line 20, a storage part for storing a program that operates in the above-mentioned manner and the received data, a utilization apparatus for utilizing the contents (a printer in the above embodiment), a driver for driving the utilization apparatus, and an interface part that enables wired or wireless connection with the apparatus.

Further, in the above embodiment, an example has been described in which the present invention is applied to a distributing system for supplying a musical score from the server 10 to the client terminal 30 as the contents; however, the present invention can be applied also to a case for distributing other contents such as sentences, various figures (maps, paintings, photographs, and others), music, or programs. In the case of sentences or various figures, restriction on printing, display of clear images, or the like may be released with the use of a key file formed as in the above embodiment. In the case of music, data such as MIDI data may be adopted as the data, and restriction on the range of listening to the music may be released with the use of the key file. For example, without the key file, data consisting only of some measures or parts forming a part of the music may be reproduced and, with the key file obtained, all the data may be reproduced. In the case of a program, restriction on the execution of the program may be released with the use of the key file. In this case, without the key file, only a general summary of the program may be introduced and, with the key file obtained, the program may be made executable.

Lastly, this invention may be practiced or embodied in still other ways without departing from the spirit or essential character thereof as described heretofore. Therefore the preferred embodiment described herein is illustrative and not restrictive, the scope of the invention being indicated by the appended claims and all variations which come within the meaning of the claims are intended to be embraced therein.

What is claimed is:

1. A musical scores distributing system comprising a server and a client terminal that are communicable with each other, said server comprising:

a database for storing a plurality of musical scores;

musical scores transmitting means for transmitting at least one of the musical scores in said database to said client terminal in accordance with a request from said client terminal; and key file transmitting means for generating and transmitting a key file including identification data sent from said client terminal to said client terminal in accordance with a request from said client terminal, the key file controlling restriction on printing one or more musical scores transmitted to said client terminal, and said client terminal comprising:

musical scores requesting means for sending a request for at least one of the musical scores stored in said database to said server;

key file requesting means for sending a request of the key file and the identification data to said server, the identification data being generated when said client terminal sends the request of the key file to said server;

a data memory for storing at least one of the musical scores and the key file transmitted from said server and for storing the identification data generated by said key file requesting means;

print controlling means for controlling the restriction on printing at least one of the musical scores in said data memory, wherein said print controlling means compares the identification data of the key file sent from the server and stored in said data memory with the identification data generated by said key file requesting means and stored in said data memory and, if both the identification data are coincident with each other, generates a print releasing file for releasing the restriction on printing at least one of the musical scores and erases the key file stored in the data memory after generating the print releasing file.

2. The musical scores distributing system according to claim 1, wherein the print controlling means included in said client terminal introduces at least one of the musical scores to the user in said client terminal by utilization of only a part of said at least one of the musical scores.

3. The musical scores distributing system according to claim 1, wherein the print controlling means included in said client terminal releases the restriction on printing at least one of the musical scores under constraint of the number of times for printing or under constraint of time.

4. The musical scores distributing system according to claim 1, wherein the key file transmitting means included in said server allows the key file to be reissued for a predetermined number of times or within a predetermined period of time after the key file is initially transmitted, in accordance with the request of the key file from said client terminal.

5. The musical scores distributing system according to claim 1, wherein the identification data is specific to a timing of the request of the key file.

6. The musical scores distributing system according to claim 5, wherein the identification data is a value which changes at random in accordance with passage of time and which is synchronized with the timing of the request of the key file.

7. The musical scores distributing system according to claim 1, wherein said server further includes fee-charging means for charging a fee to a user in said client terminal when the request of said key file is sent from said client terminal.

8. A musical scores distributing system comprising a server and a client terminal that are communicable with each other, said client terminal comprising:
  musical scores storing means for storing a plurality of musical scores:
  key file requesting means for sending a request of a key file and identification data to said server, the identification data being generated when said client terminal sends the request of the key file to the server;
  key file storing means for storing the key file transmitted from said server and for storing the identification data generated by said key file requesting means; and
  print controlling means for controlling the restriction on printing at least one of the plurality of musical scores stored in said musical scores storing means;
  said server comprising:
  key file transmitting means for generating and transmitting said key file, including the identification data sent from said client terminal, to said client terminal in accordance with a request from said client terminal, the key file controlling restriction on printing one or more musical scores,
  wherein said print controlling means compares the identification data of the key file sent from the server with the identification data generated by said key file requesting means and stored in said key file storing means and, if both identification data are coincident with each other, generates a print releasing file for releasing the restriction on printing at least one of the plurality of musical scores and erases the key file stored in the key file storing means after generating the print releasing file.

9. The musical scores distributing system according claim 8, wherein the print controlling means included in said client terminal introduces at least one of the plurality of musical scores to the user in said client terminal by utilization of only a part of said at least one of the plurality of musical scores.

10. The musical scores distributing system according to claim 8, wherein the print controlling means included in said client terminal releases the restriction on printing at least one of the plurality of the musical scores under constraint of the number of times for the utilization or under constraint of time.

11. The musical scores distributing system according to claim 8, wherein the key file transmitting means included in said server allows the key file to be reissued for a predetermined number of times or within a predetermined period of time after the key file is initially transmitted, in accordance with the request of the key file from said client terminal.

12. The musical scores distributing system according to claim 8, wherein the identification data is specific to a timing of the request of the key file.

13. The musical scores distributing system according to claim 12, wherein the identification data is a value which changes at random in accordance with passage of time and which is synchronized with the timing of the request of the key file.

14. The musical scores distributing system according to claim 8, wherein said server further includes fee-charging means for charging a fee to a user in said client terminal when the request of said key file is sent from said client terminal.

15. A client terminal that is communicable with a server that stores a plurality of musical scores, said client terminal comprising:
  musical scores obtaining means for sending a request for at least one of the musical scores to said server and for obtaining at least one of the musical scores from said server;
  key file obtaining means for sending a request of a key file and identification data to said server, the identification data being generated when said client terminal sends the request of the key file to said server, said key file controlling restriction on printing at least one of said obtained musical scores, and for obtaining said requested key file, including identification data sent from said client terminal, from said server; and
  print controlling means for controlling restriction on printing at least one of the musical scores obtained by the musical scores obtaining means, wherein said print controlling means compares identification data of the key file sent from the server with the identification data generated by said client terminal and, if both identification data are coincident with each other, generates a print releasing file for releasing the restriction on printing at least one of the musical scores and erases the key file after generating the print releasing file.

16. The client terminal according to claim 15, wherein the identification data is specific to a timing of the request of the key file.

17. A client terminal that is communicable with a server, said client terminal comprising:
  musical scores storing means for storing a plurality of musical scores;
  key file obtaining means for sending a request of a key file and identification data to said server, the identification data being generated when said client terminal sends the request of the key file to said server, said key file controlling restriction on printing of one or more musical scores among said plurality of stored musical scores, and for obtaining said requested key file, including identification data sent from said client terminal, from said server; and
  print controlling means for controlling restriction on printing at least one of the musical scores stored in said musical scores storing means, wherein said print controlling means compares identification data of the key file sent from the server with the identification data generated by said client terminal and, if both identification data are coincident with each other, generates a print releasing file for releasing the restriction on printing at least one of the musical scores and erases the key file after generating the print releasing file.

18. The client terminal according to claim 17, wherein the identification data is specific to a timing of the request of the key file.

19. A computer-readable recording medium containing a program applied to a client terminal that is communicable with a server that stores a plurality of musical scores, said program comprising:
- a musical scores obtaining process for sending a request for at least one of one or more musical scores among said plurality of stored musical scores to said server and for obtaining at least one of musical scores from said server;
- a key file obtaining process for sending a request of a key file and identification data to said server, the identification data being generated when said client terminal sends the request of the key file to said server, said key file controlling restriction on printing at least one of said obtained musical scores, and for obtaining said requested key file, including identification data sent from said client terminal, from said server; and
- a print controlling process for controlling restriction on printing at least one of the musical scores obtained by the musical scores obtaining process, wherein said print controlling process compares identification data of the key file sent from the server with the identification data generated by said client terminal and, if both identification data are coincident with each other, generates a print releasing file for releasing the restriction on printing at least one of the musical scores and erases the key file after generating the print releasing file.

20. The computer-readable recording medium according to claim 19, wherein the identification data is specific to a timing of the request of the key file.

21. A computer-readable recording medium containing a program applied to a client terminal which is communicable with a server and which stores a plurality of musical scores, said program comprising:
- a key file obtaining process for sending a request of a key file and identification data to said server, the identification data being generated when said client terminal sends the request of the key file to said server, said key file controlling restriction on printing of one or more musical scores among said plurality of stored musical scores, and for obtaining said requested key file, including identification data sent from said client terminal, from said server; and
- a print controlling process for controlling restriction on printing at least one of the musical scores stored in said client terminal, wherein said print controlling process compares identification data of the key file sent from the server with the identification data generated by said client terminal and, if both identification data are coincident with each other, generates a print releasing file for releasing the restriction on printing at least one of the musical scores and erases the key file after generating the print releasing file.

22. The computer-readable recording medium according to claim 21, wherein the identification data is specific to a timing of the request of the key file.

23. The musical scores distributing system according to claim 1, further comprising musical score display means for displaying at least one of the musical scores in a rougher display resolution than usual.

24. The musical scores distributing system according to claim 1, further comprising musical score display means for displaying at least one of the musical scores in a smaller size than usual.

25. The musical scores distributing system according to claim 8, further comprising musical score display means for displaying at least one of the musical scores in a rougher display resolution than usual.

26. The musical scores distributing system according to claim 8, further comprising musical score display means for displaying at least one of the musical scores in a smaller size than usual.

27. The musical scores distributing system according to claim 1, wherein the print releasing file is temporally stored in a RAM and the temporally stored print releasing file is erased when a program for utilizing the musical scores is finished.

28. The musical scores distributing system according to claim 8, wherein the print releasing file is temporally stored in a RAM and the temporally stored print releasing file is erased when a program for utilizing the musical scores is finished.

29. The client terminal according to claim 15, wherein the print releasing file is temporally stored in a RAM and the temporally stored print releasing file is erased when a program for utilizing the musical scores is finished.

30. The client terminal according to claim 17, wherein the print releasing file is temporally stored in a RAM and the temporally stored print releasing file is erased when a program for utilizing the musical scores is finished.

31. The computer-readable recording medium according to claim 19, wherein the print releasing file is temporally stored in a RAM and the temporally stored print releasing file is erased when a program for utilizing the musical scores is finished.

32. The computer-readable recording medium according to claim 21, wherein the print releasing file is temporally stored in a RAM and the temporally stored print releasing file is erased when a program for utilizing the musical scores is finished.

* * * * *